Oct. 13, 1936.  M. J. JOHNSON  2,057,379
DICTATING MACHINE
Original Filed Oct. 24, 1929  3 Sheets-Sheet 1

INVENTOR.
Manfred J. Johnson
BY Janney, Blair & Cutler
ATTORNEYS.

Oct. 13, 1936.     M. J. JOHNSON     2,057,379
DICTATING MACHINE
Original Filed Oct. 24, 1929     3 Sheets-Sheet 2

INVENTOR.
Manfred J. Johnson
BY
ATTORNEYS.

Oct. 13, 1936.                M. J. JOHNSON                2,057,379
                            DICTATING MACHINE
                    Original Filed Oct. 24, 1929    3 Sheets-Sheet 3

DICTATE

NEUTRAL

LISTEN

INVENTOR.
Manfred J. Johnson
BY Janney Blair & Curtis
ATTORNEYS.

Patented Oct. 13, 1936

2,057,379

UNITED STATES PATENT OFFICE 2,057,379

DICTATING MACHINE

Manfred J. Johnson, Naugatuck, Conn., assignor to Dictaphone Corporation, New York, N. Y., a corporation of New York Application October 24, 1929, Serial No. 402,247
Renewed June 13, 1933

22 Claims. (Cl. 274—17)

This invention relates to dictating machines and more particularly to condition indicating devices for same.

One of the objects thereof is to provide in a machine of the character mentioned a simple and dependable means for warning the operator in advance of any attempt to record dictation with the sound box control in other than dictation position. A further object is to provide a signal device of the above character which will be effective not only prior to the time when the machine is set in operation but which will also be effective after the machine has started and while it continues to operate.

A further object is to provide a continuous signal which will be rendered effective when the operator removes the mouthpiece from its hook, with the sound box control in other than dictation position, and which will discontinue its warning upon the sound box control being shifted into dictation receiving position. A further object is to provide a simple and efficient means for deriving a low signal voltage from the relatively high house current used to operate the machine.

Other objects will be in part obvious and in part pointed out hereinafter.

For a further disclosure of the invention, reference may be had to the following description and to the accompanying drawings showing one embodiment of the invention selected merely for purposes of illustration, and in which.

Figure 3:
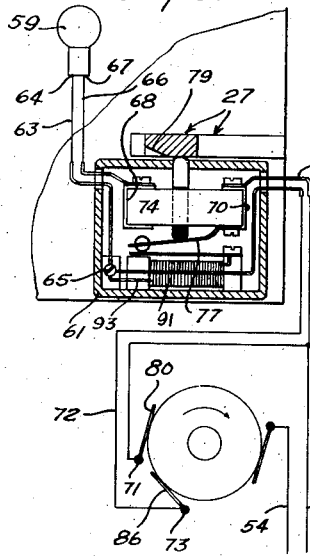
Figure 4:
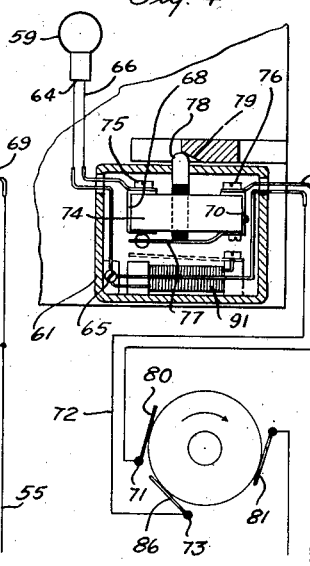
Figure 5:
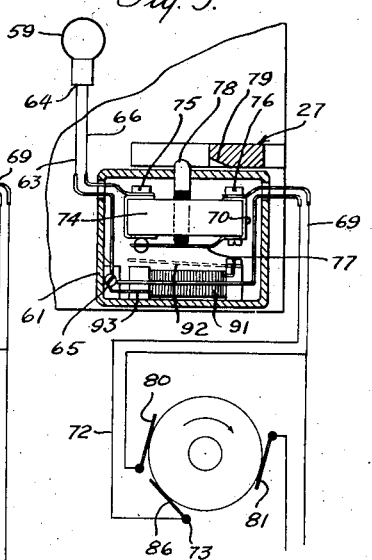

Figs. 3, 4, and 5 are in part substantially horizontal cross sectional views in different relative positions of a switch device forming part of my invention, together with a schematic showing of a circuit cooperating therewith.

Figure 3A:
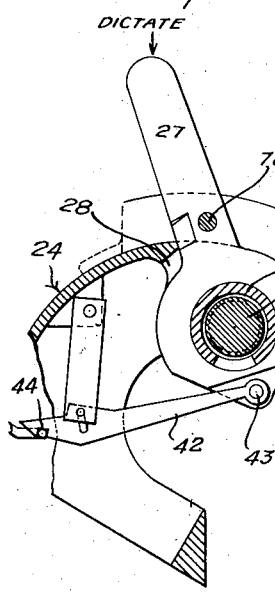
Figure 4A:
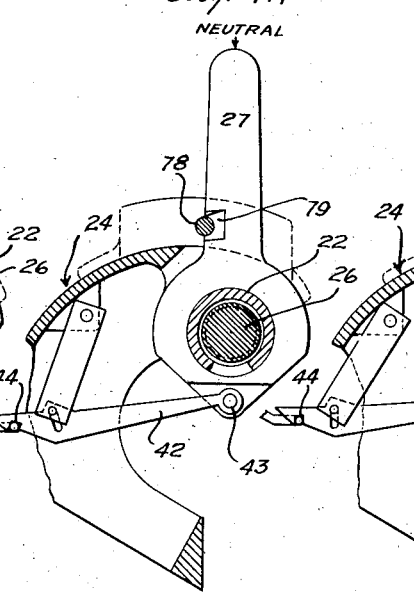
Figure 5A:
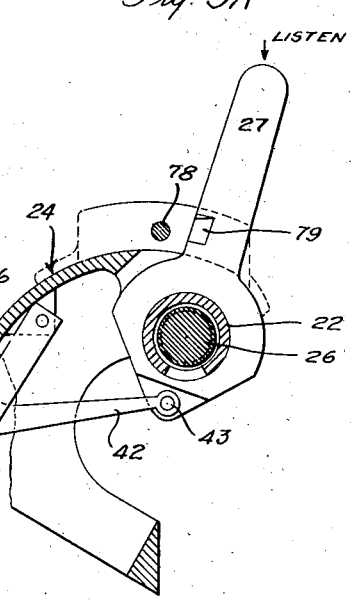

Figs. 3A, 4A, and 5A are vertical sectional views, corresponding respectively to Figs. 3, 4, and 5 and showing the parts positioned as in those figures.

Figure 1:
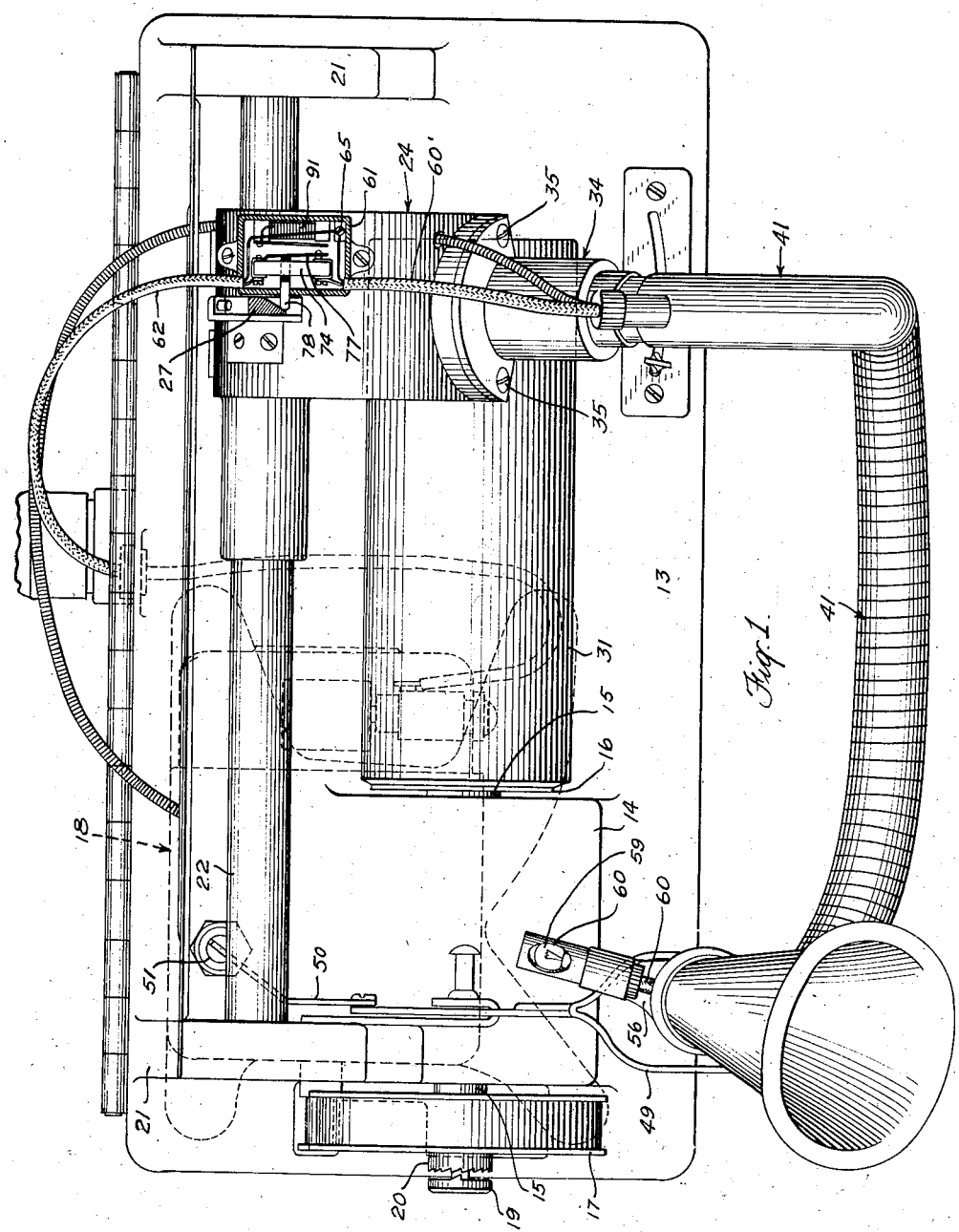
Fig. 1 is a top plan view of a dictating machine embodying my invention, certain parts being shown in cross section, while others are indicated by broken lines.
Figure 2:
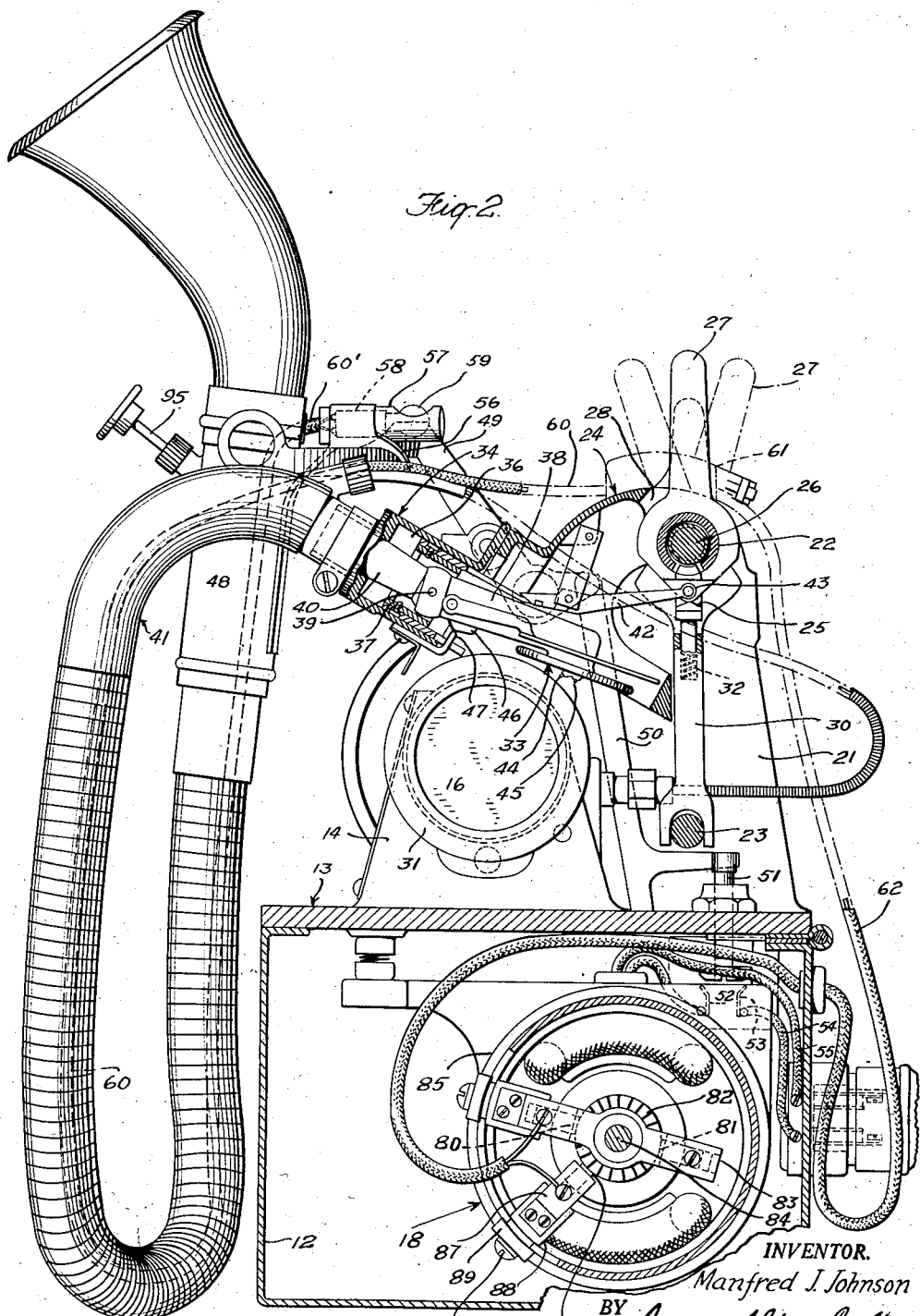
Fig. 2 is a composite view taken from the right end of the machine, various parts being shown in cross section, but not all in the same plane.

Referring to Figs. 1 and 2, the type of dictating machine selected for the purpose of describing the present invention comprises a casing 12 to which there is affixed a top plate 13. The top plate is provided with an integral left-hand standard 14 which provides a suitable bearing or support for a mandrel shaft 15 upon the outer end of which there is mounted a record support 16, and upon the other end of which there is mounted a driving pulley 17, rotated through any suitable connection (not shown), by an electric motor 18 within the casing 12; and a clutch mechanism 19, 20 is interposed between the shaft 15 and the pulley 17, the latter being loosely mounted on said shaft.

An integral right-hand standard 21 is also provided upon the top plate 13, which, with the left-hand standard 14, provides a suitable support for an upper carriage rod 22 and a lower carriage rod 23. A sound box carriage 24 is adapted to be moved longitudinally of the record support 16 upon these carriage rods, either by manual operation, or by the engagement of a feed screw 26 with a feed nut 25 mounted on said carriage.

The upper carriage rod 22 provides a suitable protective casing and support for the feed screw 26 which is driven at a speed in predetermined ratio to the speed of the record support 16, by any suitable form of transmission.

A sound box control lever 27 is pivotally mounted on the upper carriage rod 22, and extends upwardly through a cut-away portion 28 of the carriage. As is best shown in Fig. 2, the control lever may occupy any one of three different stations: recording, neutral and reproducing. When the control lever 27 is in neutral position, as shown by solid lines in Fig. 2, a cam surface thereof is adapted to engage a coacting surface on the feed nut 25, which is yieldingly supported for vertical movement in a carriage arm 30, to move the nut downwardly out of engagement with said feed screw, under which conditions the operator may manually freely shift the carriage along its supports. But when the control lever is moved into either recording or reproducing position (shown by dot-and-dash outline in Fig. 2) the feed nut is permitted to move upwardly under the influence of a compression spring 32, into engagement with the feed screw, to effect mechanically the advance movement of the carriage.

The carriage also supports a multiple station sound box 33, which moves therewith and is conditioned by the control lever 27. As shown, a casing 34 is affixed to the front of the carriage by holding screws 35 and provides an interior surface 36 for the support of a slide 37 upon which at 39 is pivotally mounted the tone-tube 38. The latter has a ball and socket connection with a telescoping tube 40 which completes the sound box connection with the sound conveying tube 41.

The slide 37 has an operative connection with the control lever 27 to move the sound box into either recording, neutral or reproducing position, which connection comprises a connecting link 42 which has at one end a pivotal connection 43 with the lower end of the control lever and at the other end a pin and slot connection 44 with an extended portion of the slide. The sound box 33 is provided with a recording stylus 44 and a reproducing stylus 45, both of which are mounted in a well known manner upon a single diaphragm to provide a combination recorder and reproducer.

The ball and socket joint and pivotal connection 39 permits the sound box a limited range of vertical movement in order to accommodate itself to record cylinders of various diameters, and to compensate for any eccentricity or run-out of the cylinders.

As shown in Fig. 2, the sound box and related parts are in neutral condition and the styli are both out of engagement with the record cylinder 31. A cam lug 46 on the tone-tube 38 has ridden up upon an adjustable guide plate 47 which serves to raise the sound box to an inoperative position with respect to the record cylinder. This condition is necessary in order properly to load and unload the mandrel 16, and also to allow forward and back spacing of the carriage without marring the record cylinder surface, as would occur if either of the styli were left in engagement with the record.

However, when the control lever 27 is moved forwardly into the recording station, the connecting link 42 pulls the slide 37 forwardly within the casing 34 and, in this movement, the cam lug 46 moves out of engagement with the guideplate 47 and allows the recording stylus 44 to engage the record cylinder 31. During this movement of the control lever the feed nut 25 moves upwardly into engagement with the feed screw, and the machine is ready to be set in operation to record dictation.

In a similar manner, when the operator moves the control lever 27 rearwardly into the reproducing position the link 42 shifts the slide 37 forwardly within the casing 34 and moves the pivotally connected tone-tube 33 forwardly until the lug 46 rides out of engagement with the guide plate 47 and allows the reproducing stylus 45 to engage sound grooves on the record cylinder 31, while at the same time the feed nut is permitted to engage the feed screw, and the machine is ready for operation to reproduce matter previously dictated.

The sound box construction and control just described in a brief manner is more fully described in the following patents: Nos. 1,003,625; 1,093,732; 1,100,024.

To operate the machine, the operator places a record cylinder 31 upon the mandrel 16 while the control lever 27 is in the neutral position. After the record cylinder is placed upon the mandrel the control lever is moved forwardly into the recording station to move the recording stylus 44 into engagement with the record cylinder surface, thereby conditioning the machine for recording dictation. He will then lift the handle portion 48 of the speaking tube 41 from off the pivotally mounted hook 49 and raise it to a position in front of his mouth. With the removal of the mouthpiece from the hook 49, a suitable spring (not shown) serves to lift the hook, which through the movement of a link 50 depresses a switch plunger 51 to bridge the gap between the contacts 52 and 53 and close the feed circuit from the power lines 54 and 55 through the electric driving motor 18.

The description hereinbefore given is directed to parts and functions common to a well-known dictating machine and has been included herein mainly to show the relationship of the present invention thereto.

Now follows a detailed description of the improvements comprising the present invention.

Present-day dictating machines are constructed or have controls which permit the operator to reproduce a portion of dictation upon the record cylinder, at will. This, for the purpose of checking mistakes, or so the operator may intelligently carry on from a point where he has left off, even after a considerable lapse of time. One type of mechanism for so conditioning the machine has been described. With this type of control, the operator need merely move the control lever from the forward recording station into the rearward reproducing station and by this operation will automatically prepare the machine for reproducing matter previously dictated.

It sometimes happens that the operator inadvertently allows the control lever to remain in its rearmost or reproducing position, and then dictates for an extended period of time only to learn later that the machine was improperly prepared for dictation. Or he may inadvertently allow the control lever to remain in neutral condition after placing the record cylinder upon the mandrel, and dictate for an extended period of time only to learn later that his dictation has not been recorded. When these mistakes occur they are both exasperating and time-wasting and the operator often has great difficulty in again taking up the thread of his discourse.

The present invention provides a simple means for warning the operator that the machine is not properly prepared for recording should the control lever be in neutral or reproducing position. This means comprises a small electric lamp mounted upon the handle of the mouthpiece in suitable proximity to the operator's eyes, which lamp will glow with considerable brilliance whenever the mouthpiece is removed from the hook with the control lever in either neutral or reproducing position.

In the present embodiment of this invention, the finger guard or hook 56 which forms part of the handle 48 is shaped to provide a support for a tubular member 57 comprising a suitable lamp socket 58, adapted to receive a small lamp 59, similar to a telephone switchboard lamp, which may be of any desired color. Also, this member 57 is fashioned to provide a protective casing for the lamp which may be seen only through a small circular aperture 60 formed in the upper side thereof. It should be noted that this arrangement of this signal lamp ensures a direct view thereof whenever the mouthpiece is held in a normal manner, so that the operator will receive the warning even though his face may be turned away from the dictating machine. In this connection it should be noted that should he wish to reproduce matter already on the record he may do so without being annoyed by the illumination of the signal lamp, which though incandescent under the condition mentioned will not be particularly noticeable to him as the light will be removed from before his eyes when he puts the mouthpiece to his ear to listen in.

Referring to Figs. 1 and 2, it will be seen that the connections for the signal lamp are encased in a twin cable 60 which passes from the lamp socket 58, inside the handle 48 and then the length of the sound tube 41. Passing out at the machine end of said sound tube the cable passes to a switch box 61. A second cable 62 passes from the switch box down to the driving motor 18 within the casing 12.

Referring to Figs. 3, 4, and 5, it will be seen that a wire 63 within the cable 60 connects the terminal 64 of the lamp socket with a terminal 65 of the switch mechanism, and that a second wire 66 within the said cable connects a terminal 67 of the lamp socket with a switch terminal 68. In the cable 62 are also two wires, one of which, 69, connects switch terminal 70 with one of the regular motor terminals 71, while the second wire 72 connects switch terminal 65 with a special motor terminal 73.

This signal lamp feed line is controlled by a novel switch device within the switch box 61, which is mounted on top of the carriage 24. This device is preferably a separate unit fastened to the carriage in any suitable manner, and comprises a casing 61 within which there is secured a block 74 of insulating material, to which the switch terminals 68 and 70 are held by holding screws 75 and 76 respectively. A spring contact 77, forming part of the terminal 70, serves to bridge the gap to the switch terminal 68, as will be described.

A plunger 78 is movably disposed in the block 74, and the side of the casing 61 so that one end normally engages a side of the spring contact 77 while the other end is so positioned as to be in operative relationship with a cam face 79 formed upon the control lever 27.

As shown in Figs. 1, 4 and 5, when the control lever 27 is in neutral or in reproducing condition, the cam face 79 of the lever 27 does not act upon the plunger 78 but permits it to be moved by tension of the spring contact 77 until the contact engages the switch terminal 68 to bridge or close the circuit between the lines 66 and 69, to light the signal lamp 59, thus to warn the operator that the machine is not properly conditioned for recording.

On the other hand, when the control lever is moved forwardly into the recording station, as shown in Figs. 3 and 3A, the cam face 79 of the control lever 27 moves the plunger 78 in the block 74 to force the spring contact 77 out of engagement with the switch terminal 68, thus opening the circuit between lines 66 and 69, to render the signal lamp 59 inoperative, thus indicating to the operator that the machine is in condition to record dictation.

The present warning device is one which can be advantageously operated only with a very low voltage, while practically all dictating machines utilizing an electric motor drive are designed for operation on standard 110 or 220 volt circuit. Accordingly, in a case of this kind the usual procedure would be to provide a suitable resistance which would not affect the motor voltage, but which would satisfactorily cut down the warning device voltage. There is, however, a very strong objection to this arrangement for it involves considerable current consumption and cost. For instance, the current ordinarily consumed by the signal lamp is approximately .3 amperes, but should it be operated by 110 volts, using a series resistance the power consumption would be $.3 \times 110 = 33$ watts, or with 220 volt current it would be $.3 \times 220 = 66$ watts, about twice as much as the motor itself ordinarily consumes. It will be readily appreciated that this arrangement would cause an excessively high operating cost for the machine.

However, the present invention provides a novel and ingenious method for producing the necessary low voltage current, needed properly to operate the warning device. This is best seen in Fig. 2 which shows the electric motor employed to drive the machine. In motors of this type it is usual to provide two brushes, as 80 and 81, to lead current to the commutator 82. These brushes, 80 and 81, are both mounted in a suitable carrier 83 which is rotatable about the motor shaft 84 and extends to the motor casing 85 at which point it is suitably insulated and adjustably secured.

The present invention provides a special third brush 86, mounted in a carrier 87, provided to make contact with the commutator 82. This carrier is provided with an insulated holder comprising a sleeve 88 and washer 89 of fiber or similar material, and a holding screw 90 therebetween which serves to hold the third brush to the motor casing. It should, however, be understood that other methods of supporting the regular commutator brushes and this special third brush may be employed. This third brush 86, in combination with one of the regular commutator brushes 80, is utilized to obtain the low voltage current necessary for the proper operation of the warning device, as follows:

The E. M. F. applied to the motor brushes is relatively high and unsuitable for lighting the signal lamp. To facilitate an understanding of applicant's third brush method of deriving a reduced voltage it should be noted that if one lead to a voltmeter is made fast to one of the main brushes and the other lead is passed in contact with the commutator progressively from the other main brush toward the first, the voltmeter will show a steadily decreasing voltage reading. A point may thus be reached at which the reading of the voltmeter will be that of any reduced voltage desired. Now if the third brush is applied to the commutator at this point, and the signal lamp is included in an external circuit between the third brush and the first of said main brushes, then the desired voltage will be supplied to the signal lamp. But as this lamp represents a small load upon the motor, imposing thereon an extra amount of work, in order to secure constant speed when the lamp is not lighted an equivalent load in the form of a compensating resistance is used so that under all conditions the load between the regular brush and the third brush is maintained constant. This is advantageous for the reason that the motor used is a universal motor, series wound so as to be applicable to power circuits of different characteristics. As is well known, such a motor will vary in speed with a variation in the load it has to carry. But changes in speed of the motor producing changes of speed of the mandrel shaft of the dictating machine, would adversely affect the recording and reproducing function of the machine.

To overcome this adverse condition, the present invention provides a small compensating resistance 91 of the same wattage consumption as the lamp, suitably fixed within the switch casing 61, which is adapted to be cut into circuit when the lamp is cut out of circuit. As shown in Figs. 1, 3, 4, and 5, this circuit balancing condition is accomplished by the provision of a yielding contact 92, shown by dot-and-dash outline, on the side of the compensating resistance, adjacent the switch spring contact 77 in such relation that it is engaged by the switch contact whenever said switch contact is moved to open the lamp circuit (as best shown in Fig. 3).

Operation of this compensating resistance can be best seen by reference to Figs. 3 and 4. In Fig. 4 it will be seen that the lamp 59 is regularly lighted by the flow of current through the line 63 and 72 to the lamp, and the line 69, closed switch contact 77, and line 66 to the lamp; and that in this position of the switch contact the resistance contact 92 is out of circuit. However, when the control lever 27 is moved forwardly to recording station (as shown in Fig. 3) the cam face 79 moves the plunger 78 and related switch contact 77 away from the terminal 68, to open the lamp circuit, and at the same time the yielding switch contact 77 engages the resistance contact 92, thus causing the current to enter the resistance 91, while the wire 93 extending to the connection 65, where it joins the feed wire 63, completes the circuit between the brushes 80 and 86 of the motor, thus ensuring a substantially constant motor speed.

In the drawings is illustrated the usual plunger 95 for manually engaging the clutch disc 19 with the pulley disc 20. If desired, this mechanism may be used to break the circuit through the signal lamp when the clutch is thrown to cause rotation of the mandrel shaft. Such an arrangement is shown and claimed in copending application No. 386,464, filed August 16, 1929, for a signal device of which I am a joint inventor. Such an arrangement is desirable where an audible signal is made as in the said copending application, for otherwise the continuance of the signal might, under some conditions, be very annoying. But this consideration is not of any great importance where a visible signal is employed, for which reason the feature mentioned has not been specifically shown or described in the present application.

It will thus be seen that this invention is one well adapted to attain the ends and objects hereinbefore set forth; that a simple and practical signal means is provided for warning the operator whenever the mouthpiece is removed from its support and the machine is not properly prepared for recording; and that a source of power for the signal means is simply, inexpensively and efficiently provided which in the operation of the device is adapted to provide a steady light in the signal lamp, without in any way affecting the satisfactory operation of the machine in recording and reproducing matter dictated thereto.

As various embodiments might be made of this invention, and as various changes might be made in the construction herein described, all without departing from the scope of the invention, it is to be understood that all matter herein set forth or shown in the accompanying drawings is to be interpreted as illustrative and not in a limiting sense.

I claim:

1. In a dictating machine, in combination, an electric signal device, an electric drive motor, a source of current supply for operating said device rendered available for that purpose when said motor is conditioned for operation, a sound box, control means for moving said sound box into recording, neutral and reproducing positions, and means adapted to connect said signal device to said source of current supply when said sound box control means occupies its neutral position.

2. In a dictating machine, in combination, an electric signal device, an electric drive motor, a source of current supply for operating said device rendered available for that purpose when said motor is conditioned for operation, a sound box, control means for moving said sound box into recording, neutral and reproducing positions, and means adapted to connect said signal device to said source of current supply when said sound box control means occupies its reproducing position.

3. In a dictating machine, in combination, an electric signal lamp, an electric drive motor, a source of current supply for operating said lamp rendered available for that purpose when said motor is conditioned for operation, a sound box, control means for moving said sound box into recording, neutral and reproducing positions, means adapted to connect said signal lamp to said source of current supply, and means adapted to actuate said connecting means to disconnect said signal lamp from its source of supply when said sound box control means is moved to recording position.

4. In a dictating machine, in combination, an electric signal lamp, an electric drive motor, a source of current supply from said motor for operating said lamp rendered available for that purpose when said motor is conditioned for operation, a sound box, control means for moving said sound box into recording, neutral and reproducing positions, means adapted to connect said signal lamp to said source of current supply, means adapted to actuate said connecting means to disconnect said signal lamp from its source of supply when said sound box control means is moved to recording position, a compensating resistance, and means for connecting said resistance in series with said current supply when said signal lamp is disconnected therefrom through movement of said sound box control to recording position, whereby substantially the same amount of current is drawn from said current supply whether said lamp is disconnected or connected.

5. In a dictating machine, in combination, an electric signal lamp, a driving unit, a source of current supply for operating said lamp rendered available for that purpose when said driving unit is conditioned for operation and rendered unavailable for operating said lamp when said driving unit is conditioned to be inoperative, a sound box, control means for moving said sound box into recording, neutral and reproducing positions, means adapted to connect said signal lamp to said source of current supply, and means adapted to prevent said last means from connecting said signal lamp to said current supply when said sound box control means occupies its recording position.

6. In a dictating machine, in combination, an electric signal lamp, a driving unit, a source of current supply for operating said lamp rendered available for that purpose when said driving unit is conditioned for operation and rendered unavailable for that purpose when said driving unit is conditioned to be inoperative, a sound box, control means for moving said sound box into recording, neutral and reproducing positions, and means adapted to connect said signal lamp to said source of supply when said sound box control means is in either neutral or reproducing position and to disconnect said signal lamp from said source of supply when said control means is moved to recording position.

7. In a dictating machine, in combination, an electric signal lamp, an electric drive motor, and a power circuit, means for connecting said motor to said power circuit, and a source of current supply for said lamp rendered available for producing a signal when said connecting means is actuated to connect said motor to its said power circuit; recording and reproducing styli, a control means for moving said styli into recording, neutral or reproducing positions respectively, and means for rendering said signal inoperative when said control means is in a certain predetermined position.

8. In a dictating machine, in combination, an electric signal lamp, an electric drive motor, a source of current supply for operating said lamp rendered available for that purpose when said motor is conditioned for operation, a sound box, control means for moving said sound box into recording, neutral and reproducing positions, and means associated with said control means for connecting said signal lamp with said current supply.

9. In a dictating machine, in combination, a visible signal device, an electric drive motor, a source of current supply for operating said device rendered available for that purpose when said motor is conditioned for operation, a sound box, control means for moving said sound box into recording, neutral and reproducing positions, and means associated with said control means for connecting said signal device with said current supply.

10. In a dictating machine, in combination, a mechanism for recording and reproducing dictation having recording, neutral and reproducing positions, a sound tube secured to said mechanism and having a mouthpiece; a support for said mouthpiece, a signal device mounted on said sound tube adjacent said mouthpiece, means for operating said signal device, and means controlling the operation of said signal device to give a visible warning when said mouthpiece is removed from said support with said mechanism occupying either its neutral or reproducing position.

11. In a dictating machine, in combination, a mechanism for recording and reproducing dictation, control means for moving said mechanism into a plurality of different positions, a mouthpiece for receiving dictation and for transmission thereof to said mechanism, a support for said mouthpiece, a signal device, means for operating said signal device, and means controlling the operation of said signal device to give a signal when said mouthpiece is removed from its support and said position control means is conditioned in a predetermined position.

12. In a dictating machine, in combination, a mechanism for recording and reproducing dictation having recording, neutral and reproducing positions, a control means for said mechanism, a sound tube secured to said mechanism and having a mouthpiece; a warning device mounted on said sound tube adjacent said mouthpiece, and means adapted to render said warning device operative when said control means occupies other than a certain selected position.

13. In a machine of the character described, a recording and reproducing unit adapted to be arranged in a neutral, recording or reproducing position, an electric circuit including a driving motor for the machine, a signal, means actuated by said unit when the latter is shifted to either a neutral or reproducing position to include the signal in circuit, a speaking tube, and a switch included in and controlling said circuit and comprising a movable contact constituting a support for said speaking tube when the latter is not in use.

14. In a machine of the character described, a recording and reproducing unit adapted to be arranged in a neutral, recording or reproducing position, and including a movable control element, an electric circuit, a signal, and means for closing the circuit to said signal, including a switch carried by said unit and including a spring influenced plunger controlling said switch and having an offset extremity disposed in the path of said movable control element of said unit, whereby said switch is closed when said unit is shifted to either a neutral or reproducing position.

15. In a dictating machine, in combination, a frame, a record support, a carriage movable along said frame relatively to said record support, a sound box mounted on said carriage having recording, neutral and reproducing positions relative to said record support, means for controlling the position of said sound box, a mouthpiece, a movable mouthpiece support mounted on said frame, a circuit connecting with an electric supply, means associated with said mouthpiece support adapted to break said circuit, an electric warning device, a circuit connected to said first circuit and including said warning device and an electric switch, and means associated with said sound box control means for closing said switch when said sound box is moved to either neutral or reproducing position and permitting said switch to stand open when said sound box is moved to recording position.

16. In a dictating machine, in combination, a movable record support, driving means for said record-support, a sound box having elements movable to selected positions relatively to said record support, a warning device, control means for preparing the driving means for operation but ineffective to cause movement of said record support, means responsive to actuation of said control means for rendering said warning device effective when said sound box elements occupy other than a certain selected position, and means for connecting said driving means with said record support effectively operable only after actuation of said control means.

17. In a machine of the character described, a recording and reproducing unit adapted to be disposed in a neutral, recording or reproducing position, a signal arranged in a normally inoperative circuit, and means rendering said circuit operative and said signal active with said unit in either its neutral or reproducing position.

18. In a machine of the character described, a recording and reproducing unit adapted to be disposed in a neutral, recording or reproducing position, a signal, an electric circuit, means for including the signal in said circuit when said unit is shifted to either a neutral or reproducing position, and means operable incident to the operation of the machine for closing said circuit.

19. In a machine of the character described, a recording and reproducing unit adapted to be disposed in a neutral, recording or reproducing position, and including a control element, a signal, an electric circuit, means actuated by said control element to include the signal in said circuit when said unit is shifted to either a neutral or reproducing position, and means for closing said circuit incident to the use of the machine.

20. In a machine of the character described, a recording and reproducing unit adapted to be arranged in a neutral, recording or reproducing position, an electric circuit including a driving motor for the machine, a signal, means actuated by said unit when the latter is shifted to either a neutral or reproducing position to include the signal in said circuit, and a switch included in and controlling said circuit.

21. In a machine of the character described, a recording and reproducing unit adapted to be arranged in either a neutral, recording or reproducing position, an electric circuit, a signal, and means for closing the circuit to said signal including a switch carried by said unit and closed thereby when said unit is shifted to either a neutral or reproducing position.

22. In a dictating machine, in combination, a record-propelling member, a source of power, means adapted to connect said source of power with said member to cause movement thereof including a manually operable primary element and a manually operable secondary element both of which must be operated to effect said connection, means normally capable of being either in operative condition for recording dictation or in inoperative condition therefor, and a warning device having such operative connection both with said last-named means and said primary element that said warning device is caused to function when said primary element is actuated with said last-named means in such inoperative condition and independently of any actuation of said secondary element.

MANFRED J. JOHNSON.